Aug. 17, 1937. F. UNGERER Re. 20,475

PLATE STRAIGHTENING MACHINE

Original Filed Aug. 31, 1934 2 Sheets-Sheet 1

Inventor:
Fritz Ungerer
by Geo. H. Mann
Atty

PLATE STRAIGHTENING MACHINE

Original Filed Aug. 31, 1934 2 Sheets-Sheet 2

Inventor
Fritz Ungerer
by [illegible]
Atty

Reissued Aug. 17, 1937 Re. 20,475

UNITED STATES PATENT OFFICE 20,475

PLATE STRAIGHTENING MACHINE

Fritz Ungerer, Pforzheim-Brotzinger, Germany

Original No. 2,049,142, dated July 28, 1936, Serial No. 742,265, August 31, 1934. Application for reissue October 17, 1936, Serial No. 106,259. In Germany September 14, 1933

5 Claims. (Cl. 153—54)

This invention relates to an adjustable supporting device for the straightening rolls of plate straightening machines.

An object of this invention is to provide adjustable supporting rollers along the straightening rolls for transmitting movement to said straightening rolls towards and away from the material to be straightened.

Another object of this invention is to provide adjusting means for the supporting rollers whereby they can be brought into their supporting position separately and independently from the other supporting rollers while the machine is running.

A further object of this invention is to support the row of straightening rolls to be deflected not only by a single pair of rows of supporting rollers arranged symmetrically to the middle of the straightening rolls but by more than two rows of supporting rollers situated as close as possible side by side along the row of straightening rolls.

A still further object of this invention is to cause the sheet being fed through the machine to deflect the straightening rolls into a working contour having waves of differing transverse amplitude.

In straightening sheets, the material is fed to the plate straightening machine at a rapid speed and it is necessary for the operator to observe the strains present in the oncoming plates to determine what adjustment is necessary to the straightening rolls and what points along the straightening rolls require more adjustment to bend or deflect the strains present in the sheet, whereby a complete straightening of the sheet is accomplished.

Various designs have been perfected in an effort to permit the operator of the plate straightening machine to adjust the straightening rolls but, while they have been partially successful, they have not completely solved the problem because the deflection curve of the straightening rolls cannot be changed sufficiently at certain points along the straightening rolls which require greater adjustment than other points.

By the present invention, it is possible, without interruption of service, to vary the vertical position of one or more straightening rolls at more points than has been possible heretofore and to any degree desired so that the position of the straightening rolls can be predetermined for the particular straightening requirements of the individual plates being fed to the machine.

These and other advantages will become apparent as the disclosure proceeds, in which.

Figure 1:
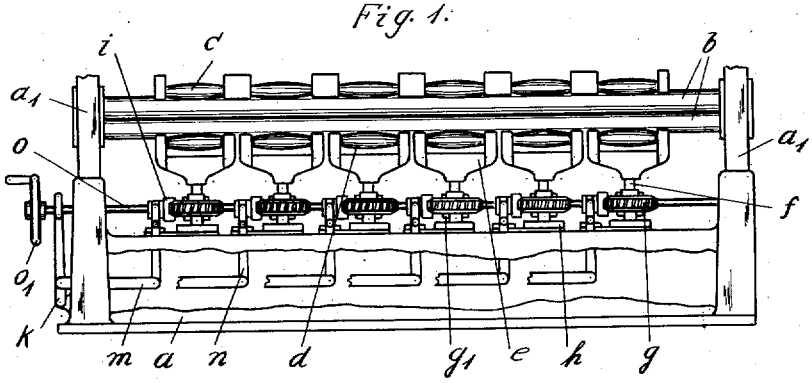
Figure 1 shows, in front elevation, a plate straightening machine with supporting rollers adjustable in rows.
Figure 4:
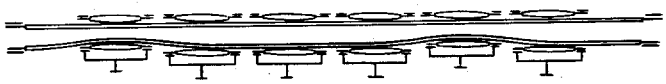
Figure 4 is a diagrammatic view showing the effect of the adjusting means of the first form of construction.
Figure 2:
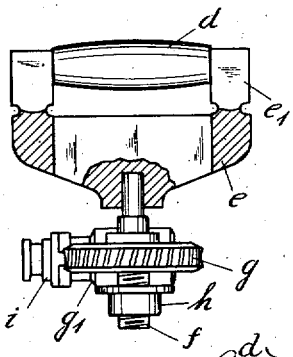
Figure 2 shows, in front elevation, a row of supporting rollers, according to the first form of construction, with adjusting means.
Figure 3:
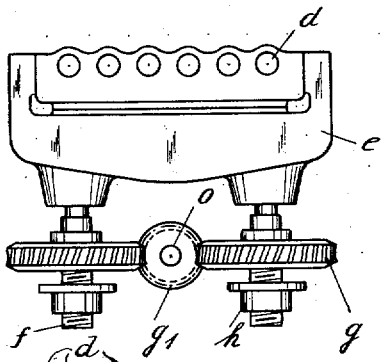
Figure 3 is a side elevation of Figure 2.
Figure 7:
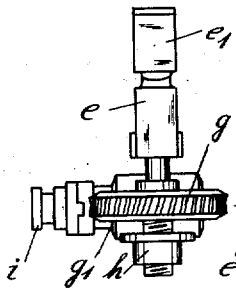
Figure 7 shows, in front elevation, a bearing member for the supporting rollers with adjusting means.
Figure 8:
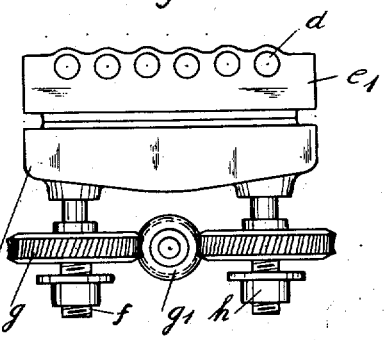
Figure 8 is a side elevation of Figure 7.

Uprights $a_1$ are mounted on a box base $a$ and upper and lower straightening rolls $b$ are journaled in these uprights. The straightening rolls are supported by supporting-rollers $c$ and $d$, the upper rollers $c$ being carried, in any desired manner, in a yoke member (not shown in the drawings) so that they participate in the adjusting movements of said yoke member. The lower rollers $d$ are mounted in rows in bearing members $e_1$ resting on slide surfaces of the bearing feet $e$ (Figures 2 and 7). These bearing feet are mounted directly on screw spindles $f$, which can be turned by means of worm-gearings $g$, $g_1$ in the nuts $h$ supported in the box base $a$.

The worm-gearings $g$, $g_1$ are driven by means of a shaft $o$ which is rotated by a hand-wheel $o_1$. Each worm-gearing $g$, $g_1$ can be coupled with the driving shaft $o$ independently of the others. For this purpose, a system of levers $k$, $m$, $n$ is provided for engaging and disengaging claw clutches $i$. According to the direction in which the shaft $o$ rotates, the screw spindles $f$ coupled therewith are screwed into or out of the nuts $h$ and consequently the bearing feet $e$ and bearing members $e_1$ are lowered or raised.

In the example illustrated in Figures 1 to 4, the lowering or raising of a bearing foot $e$ causes, at the same time, a horizontal lowering or raising of a whole row of supporting rollers on every bearing foot $e$, as the bearing members $e_1$ of the same row of supporting rollers rest. The effect of this form of construction is, therefore, that any desired row of supporting rollers can be raised or lowered any desired distance independently of the other rows of supporting rollers by engaging its associate clutch $i$. Thus, for example, in the diagram of Figure 4, the first and fifth rows of supporting rollers, counted from the hand-wheel side of the machine, are raised relative to the remaining rows of supporting rollers, resulting in a deflection of the row of straightening rolls in the shape indicated in an exaggerated manner.

In the form of construction illustrated in Figures 5 to 10, the raising and lowering of a bearing foot $e$ does not cause a horizontal but a one-sided lowering or raising of one of the two outer or of the two inner rows of supporting rollers, as two bearing members $e_1$ of two adjacent rows of supporting-rollers always rest on the inner bearing feet $e$. It is, therefore, possible to adjust in roof-shape or in pattern shape every two adjacent rows of supporting rollers relative to the rows of straightening rolls. Thus, for example, in the diagram shown in Figure 10, the outer pairs of supporting rollers are always adjusted in roof-shape, thus, causing, during the straightening of a plate, a stretching of two lateral longitudinal sections.

The clutch controlling mechanism $k$ for coupling the adjusting means $f$ separately or jointly with the common hand-wheel shaft $o$ is advantageously arranged laterally on the machine frame $a$, $a_1$ preferably near the handle of the shaft $o$.

Figure 11:
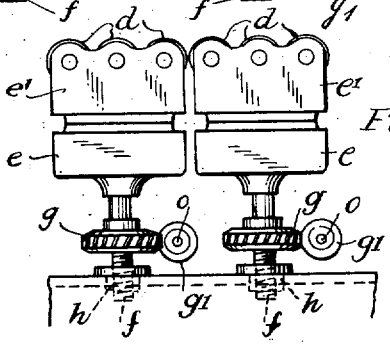
Figure 11 shows in side elevation a row of supporting rollers divided into sections with separate adjusting means for each section.
Figure 5:
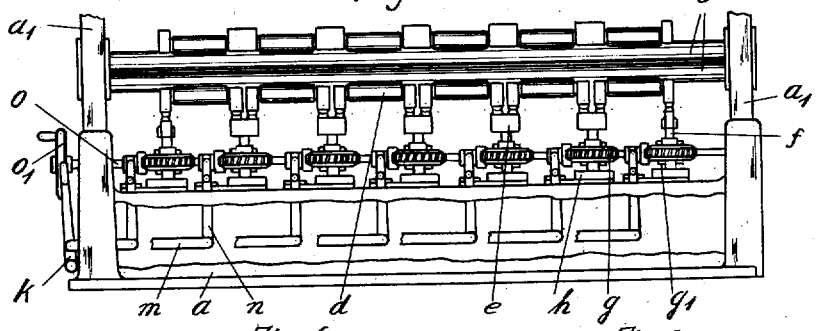
Figure 5 shows, in front elevation, a straightening machine with supporting rollers adapted to be adjusted in rows at an angle.
Figure 6:
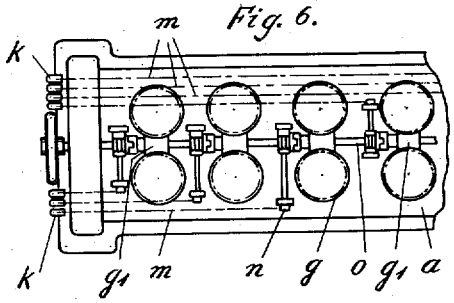
Figure 6 is a top plan of the adjusting means of the second form of construction.
Figure 9:
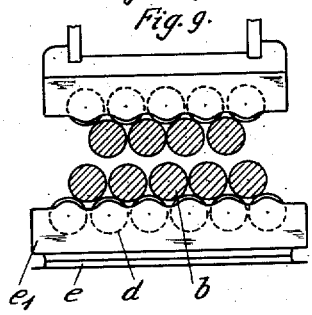
Figure 9 is a cross-section through the straightening rolls with supporting rollers.
Figure 10:
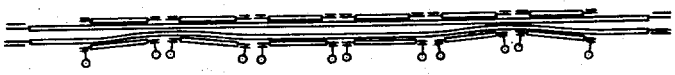
Figure 10 is a diagrammatic view showing the effect of the adjusting means of the second form of construction.

It is not necessary to act with one and the same adjusting means upon a whole row of supporting rollers, but the rows of supporting rollers may be subdivided and the parts thereof supported individually by separate adjusting means, as shown in Figure 11.

Therefore, under the present invention, it is possible to adjust the supporting rollers collectively along the straightening rolls or, if found necessary, the supporting rollers may be adjusted toward and away from the straightening rolls independently of each other. Furthermore, the rows may be adjusted in pairs with one of the ends of each pair having movement relative to the other ends of said pairs, whereby said supporting rolls have different lengths of travel in moving into their supporting position.

While I have shown and described specific embodiments of the invention, it will be understood that I do not wish to be limited exactly thereto, since various modifications may be made without departing from the scope of the invention as defined by the following claims.

I claim:

1. In a plate and sheet straightening machine including straightening rolls through which the plates or sheets to be straightened pass, means adapted to vary the horizontal plane of travel of the plates or sheets through said machine comprising supporting roller units for said straightening rolls and means for positively and selectively adjusting a plurality of said supporting roller units simultaneously and independently of the other supporting roller units, said means including a common operating shaft, gearing, and clutches adapted to form a driving connection between said gearing and said shaft.

2. In a roller leveler including horizontal straightening rolls, supporting rollers for said straightening rolls arranged in series extending parallel to the axis of said straightening rolls and adapted to support said straightening rolls over substantially the entire length of said straightening rolls and means for vertically adjusting said supporting rollers, said means including mechanism for positively and selectively producing a differential movement of the ends of individual supporting rollers vertically without interrupting the passage of the material through said roller leveler.

3. In a roller leveler including straightening rolls, rows of supporting rollers for said straightening rolls, said rows of supporting rollers arranged at right angles to the axis of said straightening rolls, and the axes of said straightening rolls and supporting rollers being parallel to each other, and means for vertically adjusting said rows of supporting rollers, said means including mechanism to positively and selectively produce a differential movement of the ends of individual rows of supporting rollers.

4. In a roller leveler including straightening rolls, a plurality of supporting means arranged along said straightening rolls for supporting the same, mechanism for moving said supporting means vertically, said mechanism including a part movable in one direction to lower some of said supporting means and to raise other of said supporting means and movable in the opposite direction to reverse the aforesaid movement of said supporting means whereby said straightening rolls will be flexed at least over a portion of their length out of the normal horizontal plane so as to subject a sheet passing through said leveler to waves or corrugations of differing transverse amplitude.

5. In a plate, sheet and strip straightening machine including a plurality of flexible straightening rolls, supports for the ends of said straightening rolls, means independent of the straightening roll pressure for varying the horizontal plane of travel of the plates, sheets and strips through the machine at, at least three points across the transverse plane of the plate, sheet or strip, said means comprising a plurality of supporting rollers arranged along said straightening rolls with some of said supporting rollers positioned centrally between the aforesaid supports for said straightening rolls and other supporting rollers being arranged at each side of said first mentioned supporting rollers to provide a substantially continuous support for said straightening rolls, from one end support to the other, means for moving said supporting rollers vertically, said means for moving said supporting rollers vertically being so constructed and arranged that working pressures of varying magnitude independent of the inherent pressure of said straightening rolls may be selectively produced at the center of said straightening rolls and at each end thereof adjacent said supports to flex the straightening rolls out of their normal horizontal plane.

FRITZ UNGERER.